United States Patent [19]

Hawkins et al.

[11] Patent Number: 5,650,484
[45] Date of Patent: Jul. 22, 1997

[54] FEEDBACK CONTROL SYSTEM FOR POLYMER MODIFICATION OF TONER RESINS AND TONERS

[75] Inventors: Michael G. Hawkins, Rochester; Hui Chang, Pittsford, both of N.Y.; Joo T. Chung, Cupertino, Calif.; Jennifer E. Dewan, Rochester, N.Y.; John J. Ianni, Medina, N.Y.; J. Stephen Kittelberger, Rochester, N.Y.; Joseph L. Leonardo, Penfield, N.Y.; Timothy L. Lincoln; Yvonne M. Kenney, both of Rochester, N.Y.

[73] Assignee: Xerox Corporation, Stamford, Conn.

[21] Appl. No.: 501,528

[22] Filed: Jul. 12, 1995

[51] Int. Cl.⁶ .................................... L08G 63/52
[52] U.S. Cl. .................... 528/481; 430/109; 430/137; 528/502
[58] Field of Search ............... 521/79, 149; 528/481, 528/502; 430/137, 109

[56] References Cited

U.S. PATENT DOCUMENTS

| | | | |
|---|---|---|---|
| 3,778,287 | 12/1973 | Stansfield et al. | 106/496 |
| 4,894,308 | 1/1990 | Mahabadi et al. | 430/137 |
| 4,973,439 | 11/1990 | Chang et al. | 264/101 |
| 5,145,762 | 9/1992 | Grushkin | 430/137 |
| 5,227,460 | 7/1993 | Mahabadi et al. | 430/109 |
| 5,376,494 | 12/1994 | Mahabadi et al. | 430/137 |

*Primary Examiner*—Morton Foelak
*Attorney, Agent, or Firm*—John S. Wagley

[57] ABSTRACT

An apparatus for the preparation of a mixture of toner resin and initiator, to form a toner resin or toner mixture including cross-linked microgel particles is provided. The apparatus includes a toner extruder having the resin being conveyed therethrough and an adder for adding the initiator to the toner resin in the toner extruder to form the toner resin or mixture. The apparatus also includes a measurer for measuring the cross-linked microgel particles in the toner mixture substantially immediately after mixing in the toner extruder and transmitting a signal indicative of the quantity of cross-linked microgel particles in the toner resin or mixture. The apparatus also includes a controller for controlling the addition rate of initiator in response to the signals from the measurer.

6 Claims, 4 Drawing Sheets

FEEDBACK CONTROL SYSTEM FOR POLYMER MODIFICATION OF TONER RESINS AND TONERS

The present invention relates to a method and apparatus for manufacturing resins. More particularly, invention relates to an apparatus and method for chemically modifying resins.

In the process of electrophotographic printing, a photoconductive surface has an electrostatic latent image recorded therein. Toner particles are attracted from carrier granules to the latent image to develop the latent image. Thereafter, the toner image is transferred from the photoconductive surface to a sheet and fused thereto.

Typically, toner may be produced by melt-mixing the soft polymer and pigment whereby the pigment is dispersed in the polymer. The polymer having the colorant dispersed therein is then pulverized. Recently in U.S. Pat. No. 5,227,460 (Mahabadi et al.), incorporated herein by reference, a low melt toner resin with minimum fix temperature and wide fusing latitude containing a linear portion and a cross-linked portion containing high density cross-linked microgel particles, but substantially no low density cross linked polymer was disclosed. A method of manufacturing that toner and its resin was disclosed in U.S. Pat. No. 5,376,494 (Mahabadi et al.), incorporated herein by reference. The method of fabricating the low fix temperature toner resins includes a reactive melt mixing process wherein polymer resins are cross-linked at high temperature and high shear. The resins are particularly suitable for high speed fusing, show excellent offset resistance and wide fusing latitude and superior vinyl offset properties. Measurement of the gel content of the toner extruded in the manufacture of the toner takes approximately 36 to 72 hours, prohibiting the use of real time feedback and subobtimizing the control of the gel content in these toner resins.

The following disclosures may be relevant to various aspects of the present invention:

U.S. Pat. No. 5,145,762 Patentee: Grushkin Issue Date: Sep. 8, 1992

U.S. Pat. No. 4,973,439 Patentee: Chang et al. Issue Date: Nov. 27, 1990

U.S. Pat. No. 4,894,308 Patentee: Mahabadi et al. Issue Date: Jan. 16, 1990

U.S. Pat. No. 3,778,287 Patentee: Stansfield et al. Issue Date: Dec. 11, 1973

U.S. Pat. No. 5,227,460 Patentee: Mahabad, et al. Issue Date: Jul. 13, 1993

U.S. Pat. No. 5,376,494 Patentee: Mahabadi et al. Issue Date: Dec. 27, 1994

U.S. patent application No. 08/247,821 Applicants: Proper et al. Filing Date: May 23, 1994

The relevant portions of the foregoing disclosures may be briefly summarized as follows:

U.S. Pat. No. 5,145,762 (Grushkin) discloses a process for the preparation of toner compositions. The process comprises melt blending toner resin particles, magnetic particles, wax, and charge additives. The process further comprises adding a coupling component to the aforementioned mixture, injecting water therein, and cooling.

U.S. Pat. No. 4,973,439 (Chang at al.) discloses an apparatus for obtaining toner particles with improved dispersion of additive components therein comprised of a toner extrusion device containing therein a blending chamber, a mixing screw, a heater, a toner supply, and an injector for injecting additive components including charge control agents into the extrusion device enabling a decrease in the melting temperature of the toner resin particles contained therein.

In U.S. Pat. No. 4,894,308 (Mahabadi et al.), a process for preparing an electrophotographic toner is disclosed which comprises premixing and extruding a pigment, a charge control additive and a resin. The pigment and the charge control additive may be premixed prior to being added to the extruder with the resin; alternatively, the pigment and charge control additive may be premixed by adding them to the extruder via an upstream supply means and extruding them, and subsequently adding the resin to the extruder via a downstream supply means.

In U.S. Pat. No. 3,778,287 (Stansfield et al.) dispersions of inorganic pigments, lakes or toners in organic liquids containing polyesters dissolved therein having acid values up to 100 derived from certain hydroxy-containing, saturated or unsaturated aliphatic carboxylic acids are described. While liquid colorants offer the distinct advantage of being more readily incorporated into the medium to be colored than dry pigments, their commercial significance is seriously limited due to the problems of handling and storing potentially hazardous liquid chemicals. Thus, from an economic and safety standpoint, it is desirable to have the colorants in a dry, storage stable form which is readily dispersible in a wide variety of coating media without detriment to any of the desirable properties of coating produced therefrom.

U.S. Pat. No. 5,227,460 (Mahabadi et al.) discloses a low melt toner resin with minimum fix temperature and wide fusing latitude containing a linear portion and a cross-linked portion containing high density cross-linked microgel particles, but substantially no low density cross linked polymer.

U.S. Pat. No. 5,376,494 (Mahabadi et al.) discloses a method of fabricating low fix temperature toner resins by a reactive melt mixing process wherein polymer resins are cross-linked at high temperature and high shear. The resins are particularly suitable for high speed fusing, show excellent offset resistance and wide fusing latitude and superior vinyl offset properties.

U.S. patent application No. 08/247,821 (Proper et al.) discloses an apparatus for the preparation of a mixture of toner resin and a liquid colorant. The apparatus includes a toner extruder having the resin being conveyed therethrough and a colorant feeder for adding the colorant to the toner resin in the toner extruder to form the toner mixture. The color of the extrudate is measured, compared to a standard and the amount of colorant added is modified accordingly.

In accordance with one aspect of the present invention, there is provided an apparatus for the preparation of a mixture of toner resin and initiator, to form a modified resin or toner mixture including cross-linked microgel particles. The apparatus includes a toner extruder having the resin being conveyed therethrough and a feeder for adding the initiator to the toner resin in the toner extruder to form the toner mixture. The apparatus also includes a measurer for measuring the crosslinked microgel particles in the toner mixture substantially immediately after mixing in the toner extruder and transmitting a signal indicative of the quantity of crosslinked microgel particles in the toner mixture.

In accordance with another aspect of the present invention, there is provided a method for the preparation of toner compositions including crosslinked microgel particles from a mixture of toner resin and an initiator. The method includes the steps of conveying the resin through an extruder, adding the initiator to the toner resin in the extruder to form the toner mixture, measuring the crosslinked gel in the toner mixture substantially immediately after mixing in the toner extruder, and transmitting a signal indicative of the quantity of cross-linked microgel particles in the toner mixture.

In accordance with yet another aspect of the present invention, there is provided a method for the preparation of toner compositions including cross-linked microgel particles from a mixture of toner resin and an initiator. The method includes the steps of conveying the toner resin through an extruder, adding the initiator to the toner resin in the extruder to form the toner mixture, measuring spectral bands of the cross-linked gel in the toner, converting the spectral bands into a measurement of the cross-linked gel, and transmitting a signal indicative of the quantity of cross-linked microgel particles in the toner mixture.

The invention will be described in detail herein with reference to the following Figures in which like reference numerals denote like elements and wherein:

BRIEF DISCRIPTION OF DRAWINGS

Figure 1:
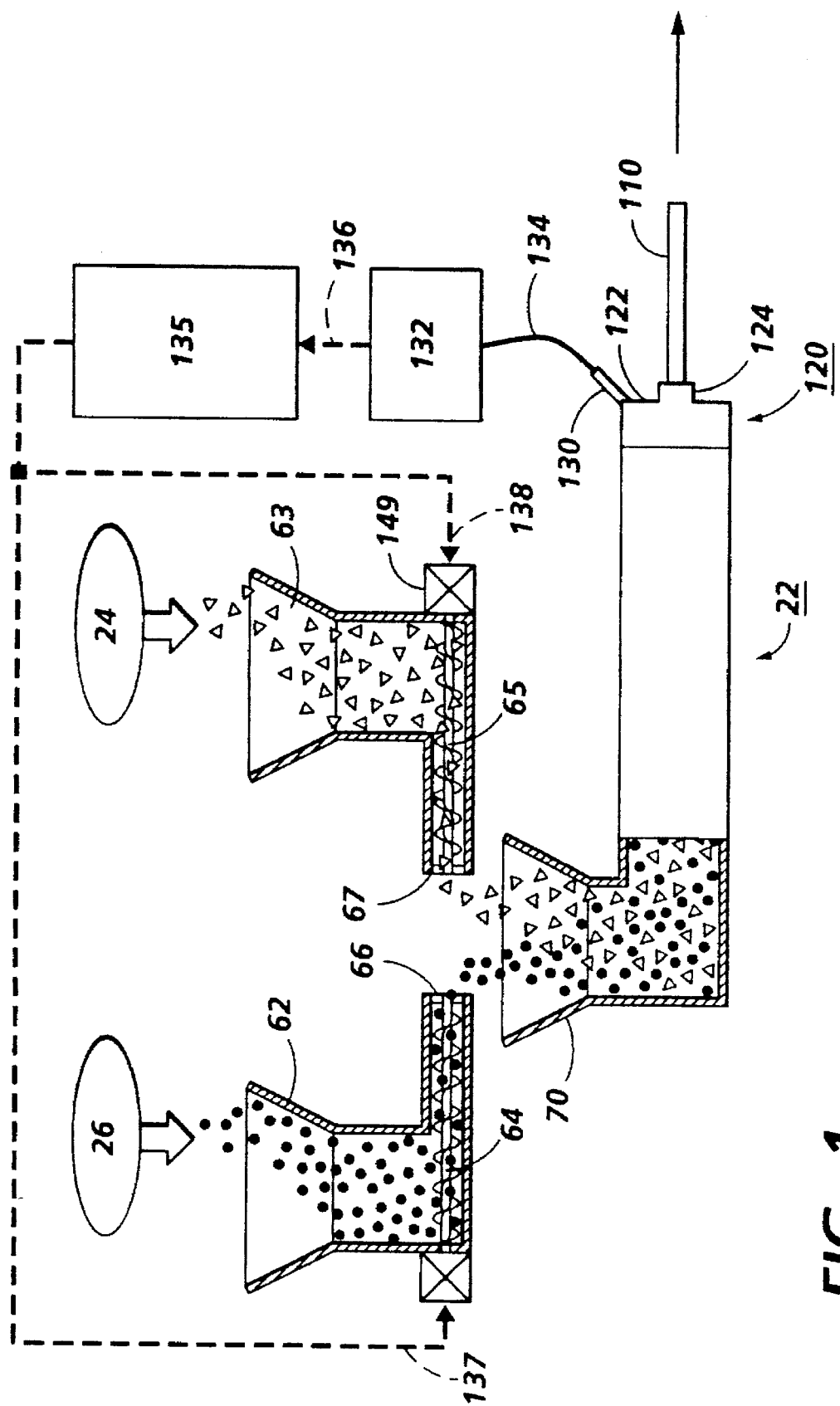
FIG. 1 is a schematic elevational view of an extruder utilizing the chemical initiator addition system of the present invention.
Figure 2:
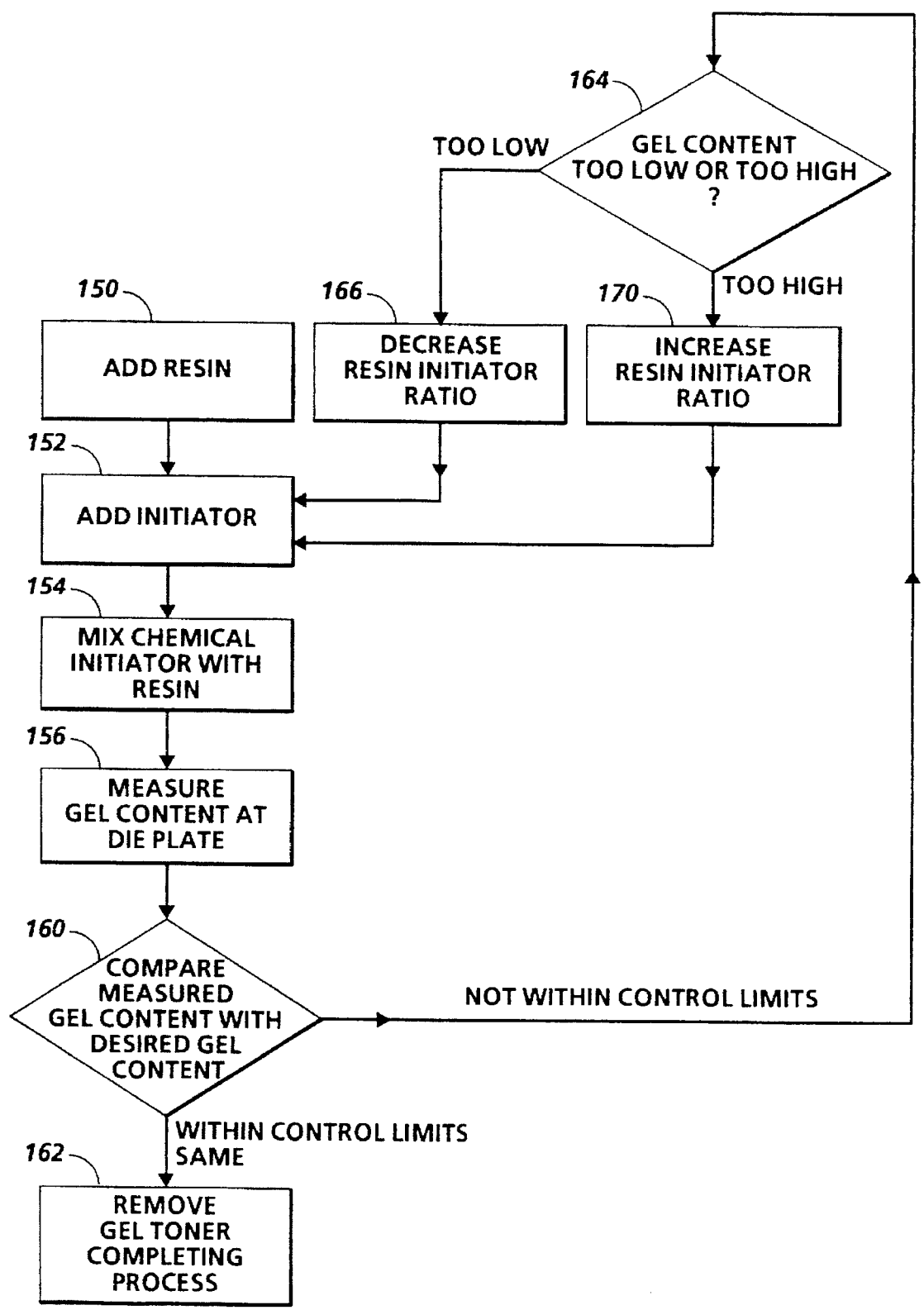
FIG. 2 is a block diagram of the chemical initiator injection system of FIG. 1.

According to the present invention, the toner created by the process of this invention comprises a resin and preferably a charge control additive and other known additives. The manufacture of black toners will be discussed henceforth. It should be readily apparent that the manufacture of colored toner may likewise include the process of the present invention.

The base resin used in the process of this invention is a reactive polymer, preferably a linear reactive polymer such as, for example, linear unsaturated polyester. In preferred embodiments, the base resin has a degree of unsaturation of about 0.1 to about 30 mole percent, preferably about 5 to about 25 mole percent. In a preferred embodiment, the linear unsaturated polyester base resin is characterized by number-average molecular weight (Mn) as measured by gel permeation chromatography (GPC) in the range typically from 1000 to about 20,000, and preferably from about 2000 to about 5000, weight-average molecular weight ($M_w$) in the range typically from 2000 to about 40,000, and preferably from about 4000 to about 15,000. The molecular weight distribution ($M_w/M_n$) is in the range typically from about 1.5 to about 6, and preferably from about 2 to about 4. Onset glass transition temperature ($T_g$) as measured by differential scanning calorimetry (DSC) is in the range typically from 50° C. to about 70° C., and preferably from about 51° C. to about 60° C. Melt viscosity as measured with a mechanical spectrometer at 10 radians per second is from about 5,000 to about 200,000 poise, and preferably from about 20,000 to about 100,000 poise, at 100° C. and drops sharply with increasing temperature to from about 100 to about 5000 poise, and preferably from about 400 to about 2,000 poise, as temperature rises from 100° C. to 130° C.

Linear unsaturated polyesters used as the base resin are low molecular weight condensation polymers which may be formed by the step-wise reactions between both saturated and unsaturated diacids (or anhydrides) and dihydric alcohols (glycols or diols). The resulting unsaturated polyesters are reactive (e.g., cross-linkable) on two fronts: (i) unsaturation sites (double bonds) along the polyester chain, and (ii) functional groups such as carboxyl, hydroxy, etc. groups amenable to acid-base reactions. Typical unsaturated polyesters useful for this invention are prepared by melt polycondensation or other polymerization processes using diacids and/or anhydrides and diols. Suitable diacids and anhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like and mixtures thereof. Suitable diols include but are not limited to, for example propylene glycol, ethylene glycol, diethylene glycol, neopentyl glycol, dipropylene glycol, dibromoneopentyl glycol, propoxylated bisphenol-A, 2,2,4-trimethylpentane-1,3-diol, tetrabromo bisphenol dipropoxy ether, 1,4-butanediol, and the like and mixtures thereof, soluble in good solvents such as, for example, tetrahydrofuran, toluene and the like.

Preferred linear unsaturated polyester base resins are prepared from diacids and/or anhydrides such as, for example maleic anhydride, fumaric acid, and the like and mixtures thereof, and diols such as, for example, propoxylated bisphenol-A, propylene glycol, and the like and mixtures thereof. A particularly preferred polyester is poly (propoxylated bisphenol A fumarate).

Substantially any suitable unsaturated polyester can be used in the process of the invention, including unsaturated polyesters known for use in toner resins and including unsaturated polyesters whose properties previously made them undesirable or unsuitable for use as toner resins (but which adverse properties are eliminated or reduced by cross-linking them by the process of the present invention).

In a process of this invention, a reactive base resin and a chemical initiator are fed to a reactive melt mixing apparatus and cross-linking is carried out at high temperature and high shear to produce a cross-linked resin which enables the preparation of low fix temperature toners with good fusing latitude and vinyl offset properties.

Any appropriate initiation technique for cross-linking can be used in the process of the invention. Chemical initiators such as, for example, organic peroxides or azo-compounds are preferred for this process. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di (t-butyl peroxy) hexane, t-butyl cumyl peroxide, α-α-bis (t-butyl peroxy) diisopropyl benzene, di-t-butyl peroxide and 2,5-dimethyl 2,5-di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy) cyclohexane, 1,1-di (t-amyl peroxy) cyclohexane, 2,2-di (t-butyl peroxy) butane, ethyl 3,3-di (t-butyl peroxy) butyrate and ethyl 3,3-di (t-amyl peroxy) butyrate. Suitable azo-compounds include azobis-isobutyronitrile, 2,2'-azobis (isobutyronitrile), 2,2'-azobis (2,4-dimethyl valeronitrile), 2,2'-azobis (methyl butyronitrile), 1,1'-azobis (cyano cydohexane) and other similar known compounds.

In the cross-linking reaction which occurs in the process of the present invention at high temperature and high shear, the chemical initiator, such as for example benzoyl peroxide, dissociates to form free radicals which attack the linear unsaturated base resin polymer chains (e.g., at double bonds) to form polymeric radicals. Cross-linking occurs as these polymeric radicals react with other unsaturated chains or other polymeric radicals many times, forming very high molecular weight gel particles with high cross-linking density.

The cross-linking which occurs in the process controlled by the present invention is characterized by at least one reactive site (e.g., one unsaturation) within a polymer chain reacting substantially directly (e.g., with no intervening monomer(s)) with at least one reactive site within a second polymer chain, and by this reaction occurring repeatedly to form a series of cross-linked units. This polymer cross-linking reaction may occur by a number of mechanisms.

This manner of cross-linking between chains will produce a large, high molecular weight molecule, ultimately forming a gel.

A small concentration of initiator is adequate to carry out the cross-linking, usually in the range from about 0.01 to about 10 percent by weight of initiator in the base resin, and preferably in the range from about 0.1 to about 4 percent by weight of initiator in the base resin. By carrying out the cross-linking in the melt state at high temperature and high shear in a melt mixing device such as an extruder, the gel particles formed during cross-linking are kept small (i.e. less than about 0.1 micron, and preferably about 0.005 to about 0.1 micron, in average volume particle diameter as determined by scanning electron microscopy and transmission electron microscopy) and their size does not grow with increasing degree of cross-linking. Also, the high shear enables the microgel particles to be substantially uniformly dispersed in the polymer melt.

An advantage of using a chemical initiator as the cross-linking agent is that by utilizing low concentrations of initiator (for example, less than 10 percent by weight and often less than 4 percent by weight) and carrying out the cross-linking at high temperature, little or no unreacted initiator remains in the product, and therefore, the residual contaminants produced in the cross-linking reaction are minimal.

Thus, the cross-linked resin produced in the process controlled by this invention is a clean and safe polymer mixture comprising cross-linked gel particles and a noncross-linked or linear portion but substantially no sol. The gel content of the cross-linked resin ranges from about 0.001 to about 50 percent by weight, and preferably from about 0.1 to about 40 or 10 to 19 percent by weight The resin or resins are generally present in the resin-toner mixture in an amount of from about 50 percent to about 100 percent by weight of the toner composition, and preferably from about 80 percent to about 100 percent by weight.

Additional components of the toner may be added to the resin prior to mixing the resin with the chemical initiator. Alternatively, these components may be added during extrusion. Some of the additional components may be added after extrusion, such as the charge control additives, particularly when the toner is to be used in a liquid developer. These components include but are not limited to stabilizers, waxes, and charge control additives. The present invention enables the measurement and control of these components via the feedback control loop.

The conventional measurement or assay for the extent of the cross-linking in reactive extrusion of unsaturated polyester resins is the wet-chemical gravimetric analysis for insoluble gel. This analysis requires a minimum of 36 hours, and offers no possibility, therefore, for rapid-turnaround or on-line analysis.

The percent transmission of light through a resin sample in the near infrared wavelength range (1100–2400 nanometers) varies with the gel content in at least three spectral bands, namely at around 1180 nanometers (nm), 1660 nm and 2250 nm. This information is shown graphically in FIG. 5.

The percent transmission of light through a resin sample at three spectral bands, namely at around 1180 nm, 1660 nm and 2250 nm is proportional to the quantity of cross-linked polyester in the resin composition exiting an extruder. A comparison of the wet-chemical gravimetric analysis for insoluble gel was made to the spectrum from each scan of a near infrared (NIR) spectrophotometer on a resin sample with an interactance probe installed in the die head of the extruder. Partial Least Squares (PLS) regression modeling was used to build a calibration equation between the percent transmission of light at spectral bands around 1180 nm, 1660 nm and 2250 nm to the gel content in the sample.

To validate this model, gravimetric gel measurements were made and compared with NIR measurements taken during polyester cross-linking runs of extruded resin. Table 2 is a listing of the 25 resin samples of extruded resin for which gravimetric gel measurements were compared against PLS regression derived gel content from NIR spectral bands. The results were used to build a calibration equation for on-line measurement. Four distinct levels of gel content were used: 2%, 6%, 11%, and 30%.

Results of this analysis is shown in Table 1 as follows:

TABLE 1

| Resin ID | Gravimetric Measured % Gel | NIR Measured % Gel |
|---|---|---|
| REX01-10G | 8 | 7.496 |
| REX01-10G | 8.2 | 8.92 |
| REX01-10G | 8.5 | 7.527 |
| REX01-10G | 5.9 | 8.09 |
| REX01-10G | 10.1 | 6.963 |
| REX02-24G | 31.2 | 31.863 |
| REX02-24G | 31.3 | 32.036 |
| REX02-24G | 31 | 29.426 |
| REX02-24G | 29.1 | 30.14 |
| REX02-24G | 27.8 | 27.692 |
| REX01-8A | 1.9 | 3.391 |
| REX01-8A | 1.8 | 2.583 |
| REX01-8A | 2.0 | 1.411 |
| REX01-8B | 11.2 | 11.94 |
| REX01-8B | 11.4 | 8.105 |
| REX01-8B | 11.6 | 14.725 |
| REX02-23A | 27.4 | 25.109 |
| REX02-23A | 28.1 | 27.568 |
| REX02-23A | 28.7 | 28.394 |

TABLE 1-continued

| Resin ID | Gravimetric Measured % Gel | NIR Measured % Gel |
| --- | --- | --- |
| REX01-8C | 1.5 | 1.587 |
| REX01-8C | 1.7 | 2.125 |
| REX01-8C | 1.9 | 2.572 |
| REX01-8D | 5.8 | 3.81 |
| REX01-8D | 5.3 | 3.302 |
| REX01-8D | 6.4 | 7.352 |

Figure 4:
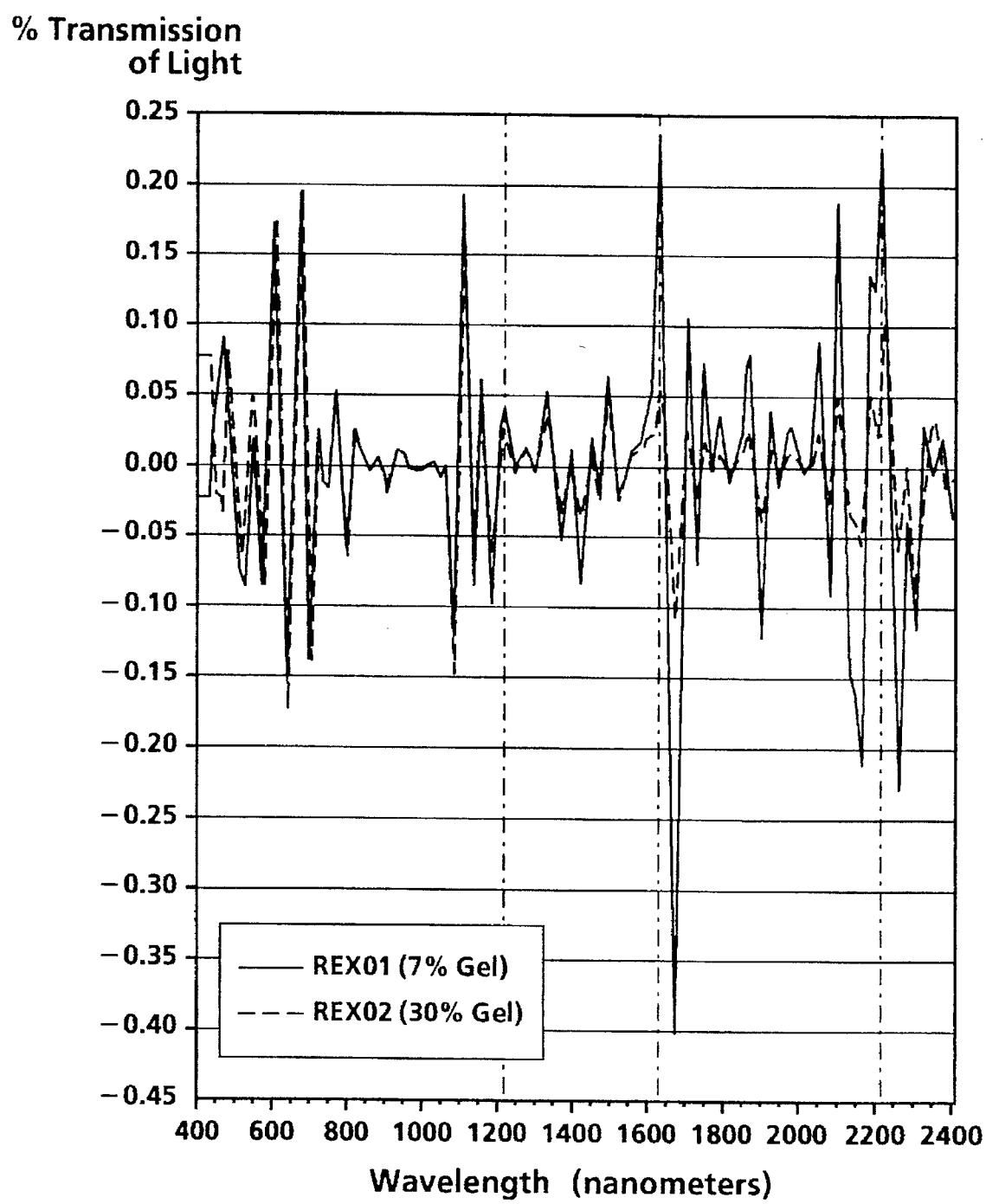
FIG. 4 is a graph of the % transmission of light and the wavelength for a toner resin utilized in the present invention.

A graph of the gravimetric gel measurements versus NIR generated gel measurements of the data of Table 2 is shown in FIG. 4. A correlation factor of 0.98 was calculated along with a standard error of 1.7%. The curve for the regression is as follows:

$$Y=0.988X+0.015 \quad R^2=0.98$$

$$\text{Std. Error}=1.7\%$$

To further validate this model, gravimetric gel measurements and NIR generated gel measurements were taken on fifty consecutive samples of toner. The mean and standard deviation of these samples are shown in Table 2 as follows:

TABLE 2

| Extruder | CAA Measured Gel Content (% Gel) | NIR Measured Gel Content (% Gel) |
| --- | --- | --- |
| ZSK-40 | 29.78 ± 1.30 | 29.19 ± 0.91 |
| ZSK-58 | 24.62 ± 1.68 | 23.88 ± 1.27 |

The standard deviation for the NIR generated gel measurements is thus less than the standard deviation for the gravimetric gel measurements. The NIR measurements thus were more accurate.

Using a near infrared spectrophotometer with probe installed in the die head of the extruder, the degree of cross-linking, or gel content could be quantified in a one minute analysis period. This measurement of gel content by NIR also provides the parameter needed for closed-loop feedback control of the cross-linking reaction.

Referring first to FIG. 1, a toner preparing apparatus 20 in the form of an extruding system is shown. The toner preparing apparatus 20 includes an extruder 22 for mixing chemical initiator 24 with dry resin 26 and for converting the dry resin 24 into a liquid form having a portion of the toner in gel form. Generally, any extruder, such as a single or twin screw extruder, suitable for preparing electrophotographic toners, may be employed for mixing the chemical initiator 24 with the resin 26. For example a Werner & Pfleiderer WP-28 extruder is well-suited for melt-blending the resin 26, a chemical initiator 24, and additives. The resin 26 is stored adjacent the extruder 22 in a dry toner resin feeder hopper 62. The resin 26 is uniformly fed from the hopper 62 by an auger 64 to a resin hopper outlet 66. The resin hopper outlet 66 is located adjacent a extruder resin inlet 70 into which the resin 26 is deposited. After the resin 26 is added to the extruder 22, the chemical initiator 24 is added to the extruder 22. The chemical initiator may be wet or dry. The use of dry initiator will be described herein, but it should be appreciated that the chemical initiator may likewise be in liquid form.

The chemical initiator 24 may be any suitable chemical capable of assisting the conversion of an unsaturated toner resin into a partially saturated toner resin. The percentage of conversion preferred may very widely from approximately 40 percent for black toners to approximately 5–7 percent for colored toners. An organic peroxide has been found to be effective in assisting such a conversion from unsaturated toner resin to partially saturated toner resin. The organic peroxide for example may be a benzoyl peroxide.

The chemical initiator 24 is stored adjacent the extruder 22 in a dry chemical initiator feeder hopper 63. The chemical initiator 24 is uniformly fed from the hopper 63 by an auger 65 to a chemical initiator outlet 67. The chemical initiator outlet 67 is located adjacent the extruder resin inlet 70 into which the chemical initiator 24 is deposited. As the chemical initiator 24 is mixed with resin 26, an extrudate 110 is formed which contains the chemical initiator 24 evenly distributed within the resin 26. The screws (not shown) within the extruder 22 are preferably turned at the fastest rate which allows the molten resin to achieve the desired temperatures. The extrudate continues to pass through the extruder 22 to a die plate 120 located at an outlet 122 of the extruder 22. The die plate 120 includes a large rectangular aperture 124 through which the extrudate 110 exits the extruder 22. At the die plate 120, the temperature is raised from approximately 110° C. to above 200° C. temperature to obtain a temperature which fluidizes the extrudate and causes it to flow freely through the aperture 124. The pressure in the preceding mixing zone can be increased by restricting the size of the aperture 124, at the expense of throughput. The aperture 124 is chosen of suitable size to provide flow sufficient to provide for a commercially acceptable process.

A detector such as a near-infrared (NIR) spectrophotometric sensor 130 is located in the die plate 124. The near-infrared sensor 130 measures the % transmission of light through the resin at various wavelengths. Signals indicative of the % transmission of light at the various wavelengths are sent by conduit 134, such as a fiber optic cable, to a NIR micro-processor 132. A typical fiber optic cable has a co-axial construction with an internal path to the NIR micro-processor and an external path to the sensor.

This results in a near infrared spectrum being created for the sample material. Then, based on the PLS regression of specific wavelength intensities to gel content, as measured by the laboratory gravimetric method, the NIR micro-processor 132 predicts a gel content value for the sample. The NIR micro-processor 132 then converts the gel content to an electrical signal which is sent via insulated copper wires 136 to the feedback controller 135. The controller 135 may be any suitable device capable of comparing the signals from the NIR micro-processor 132 with the desired value, or setpoint. For example, the controller 135 may be a programmable logic controller (PLC) or distributive control system (DCS) capable of proportional, integral, or derivative control (PID). The feedback controller 135 further compares the measured percent gel content in the resin sample to a predetermined desired percent gel content determined and entered by the operator. The controller 135 then calculates a new ratio of initiator to resin and sends electrical signals through conduits 137 and 138 respectively to control devices 139 and 149, for example motors, to rotate the feed screws 64 and 65, for the resin 26 and the initiator 24, respectively. The initiator concentration entering the extruder 22 is thus increased or decreased. For a modern production process, the extrudate passes through the extruder 22 in a matter of a few seconds. Therefore, the near-infrared sensor 130 can measure the gel content of the extrudate 110 and make an immediate adjustment in the chemical initiator 24 entering the extruder 22 whereby only a minute amount of extrudate 110 will pass through the extruder 22 before the adjustment is made. It should be appreciated that the feedback controller 132 may include logic with a time delay (not shown) whereby the gel content of the extrudate 110 is measured by the infra-red sensor 130 only at periodic intervals whereby the feedback system may remain stable.

Figure 3:
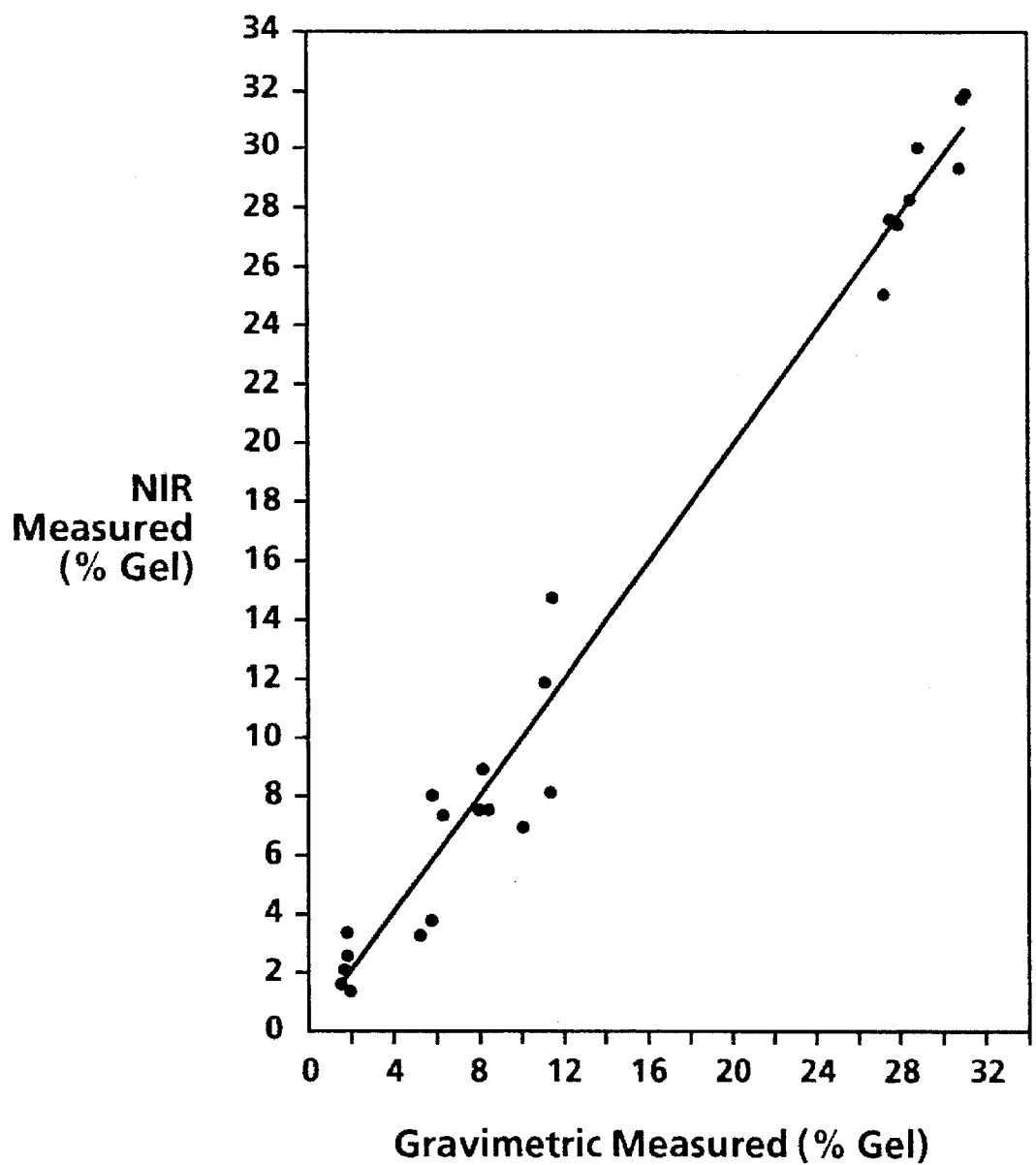
FIG. 3 is a graph of the near-infrared measured gel content and the gravimetric measured gel content for a toner resin utilized in the present invention.

The control logic is shown schematically in FIG. 3. At operational block 150 resin is added to the extruder 22 by feeder 64. Next, at operational block 152, the chemical initiator is added by feeder 65. Next, at operational block 154, the chemical initiator 24 is mixed with the resin 26 in the extruder 22. At operational block 156, the near-infrared sensor 130 measures the percent gel content. At decision block 160 the measured gel content is compared with the desired gel content within the logic of the feedback controller 132. If the measured gel content of the extrudate 110 is the same or almost the same as the desired gel content of the extrudate 110, the extruder 22 continues to operate with the feeder 65 remaining at its present rate and the gel contented toner is removed in operational block 162 for further processing.

Alternatively, if the measured gel content of the extrudate 110 is different than the desired gel content of the extrudate 110, a determination is made at decision block 164 whether the gel content signal of the extrudate 110 is too low or too high. If the gel content signal is too low, the ratio of feeder 64 rate to feeder 65 rate is decreased at operational block 166, such that a constant total throughput is maintained (feeder 64 rate+feeder 65 rate=constant). Likewise, if the gel content signal is too high, the ratio of feeder 64 rate to feeder 65 rate is increased at operational block 170.

The chemical initiator 24 which now has a revised flow rate is then mixed with resin 26 which also has a revised flow rate as shown in operational block 154. As shown in operational block 156, the gel content of the extrudate 110 is measured by the infra-red sensor 130 and, then as shown in decisional block 160, the measured gel content of the extrudate 110 is compared with the desired gel content of the extrudate 110. If the gel content is not the same, the decisional block 164 is reached and further adjustment of the feeder 64 to feeder 65 rate ratio is made, whereas if the gel content is the same, the operational block 162 is reached and the resin is removed for further processing.

The extrudate 110 from the extruder 22 is further processed into small particles by a mill or other commercially available equipment.

The extrudate 110 may be used as a resin to be inputted into a toner extruder where it may be blended with additives and colorant to form a toner or, alternatively, the resin 26 may possibly be blended with additives and colorant simultaneously with the addition of chemical initiator to provide an extrudate 110 in the form of a toner.

The use of the NIR spectrophotometric gel content feedback system of the present invention provides for real time chemical initiator level adjustment with the ability to fine tune the gel content of the resin or toner produced. When the wet chemical gravimetric analysis is used either the system must be shut down for at least 36 hours or the system may be producing defective toner for that period of time.

While the invention has been described with reference to the structures and embodiments disclosed herein, it is not confined to the details set forth, and encompasses such modifications or changes as may come within the purpose of the invention.

We claim:

1. A method for the preparation of modified resins including cross-linked microgel particles from a mixture of resin particles and an initiator, comprising:

conveying the resin particles through an extruder;

adding the initiator to the resin in the extruder to form the modified resin;

measuring the cross-linked gel in the modified resin substantially immediately after mixing in the extruder; by transmitting from a spectroscope a signal indicative of the quantity of cross-linkage in the microgel resin.

2. The method of claim 1, further comprising converting the signal indicative of the quantity of the cross-linked gel to an initiator signal indicative of the quantity of initiator in the modified resin.

3. The method of claim 2, further comprising controlling the addition rate of the initiator to the extruder in response to the initiator signal.

4. The method of claim 1, further comprising connecting initiator chambers to said extruder simultaneously with the step of conveying the resin.

5. The method of claim 2, further comprising determining that the quantity of cross-linked microgel particles in the modified resin is within an acceptable quantity range.

6. A method of claim 2, wherein the measuring step comprises:

measuring spectral bands of the cross-linked gel in the modified resin; and converting the spectral bands into a measurement of the quantity of cross-linked gel.

\* \* \* \* \*